United States Patent
Long

(10) Patent No.: US 8,543,668 B1
(45) Date of Patent: Sep. 24, 2013

(54) CLICK TRACKING USING LINK STYLES

(75) Inventor: Dustin Long, New York, NY (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 12/625,424

(22) Filed: Nov. 24, 2009

(51) Int. Cl.
*G06F 15/16* (2006.01)

(52) U.S. Cl.
USPC ............................ 709/219; 709/217; 709/223

(58) Field of Classification Search
USPC .......................................................... 709/219
See application file for complete search history.

(56) References Cited

U.S. PATENT DOCUMENTS

2007/0256003 A1* 11/2007 Wagoner et al. ............ 715/501.1
2008/0178073 A1* 7/2008 Gao et al. ....................... 715/243
2008/0235085 A1* 9/2008 Kovinsky et al. ................ 705/14

OTHER PUBLICATIONS

Wikipedia, "Cascading Style Sheets." [online], [retrieved on Nov. 24, 2009]. Retrieved from the Internet /en.wikipedia.org/wiki/Cascading_Style_Sheets>, All pages.*
CSS Pseudo-Classes, [online], [retrieved on Nov. 24, 2009]. Retrieved from the Internet http://www.w3schools.com/CSS/css_pseudo_classes.asp>, All papes.*
CSS Pseudo-Classes, [online], [retrieved on Nov. 24, 2009]. Retrieved from the Internet <URL: http://www.w3schools.com/CSS/css_pseudo_classes.asp>, 4 pages.
Tizag, "CSS Tutorial—Pseudo Class & Mouseover." [online], [retrieved on Nov. 24, 2009]. Retrieved from the Internet <URL: http://www.tizag.com/cssT/pclass.php>, 3 pages.
Wikipedia, "Cascading Style Sheets." [online], [retrieved on Nov. 24, 2009]. Retrieved from the Internet <URL: http://en.wikipedia.org/wiki/Cascading_Style_Sheets>, 12 pages.
Wikipedia, "Markup Language." [online], [retrieved on Nov. 24, 2009]. Retrieved from the Internet <URL: http://en.wikipedia.org/wiki/Markup_language>, 7 pages.
Wikipedia, "Style Sheet Language." [online], [retrieved on Nov. 24, 2009]. Retrieved from the Internet <URL: http://en.wikipedia.org/wiki/Style_sheet_language>, 2 pages.

* cited by examiner

*Primary Examiner* — Wing F Chan
*Assistant Examiner* — Andrew Woo
(74) *Attorney, Agent, or Firm* — Fish & Richardson P.C.

(57) ABSTRACT

Methods, systems, and apparatus for tracking user clicks on result links in a search result webpage disclosed. In one aspect, a method includes generating one or more webpages each including a link to a destination document; specifying a style for the link in each webpage according to a style sheet language, the style including a behavior trigger indicating user selection of the link and a display property that causes retrieval of a resource from a remote server when the behavior trigger is activated; providing the webpages with the specified style to a plurality of clients; receiving at the remote server one or more requests from at least one of the plurality of clients for the resource; and in response to the receiving, recording a count for user selection of the destination document based on a number of received requests for the resource.

21 Claims, 7 Drawing Sheets

CLICK TRACKING USING LINK STYLES

BACKGROUND

An internet search engine is a tool typically designed to search for information on the World Wide Web. Users submit search queries to the search engine and the search engine identifies and presents a list of result documents in response to each search query. The list of result documents consists of links to webpages, images, and other types of files, typically identified and retrievable by their Uniform Resource Locators (URLs). To identify documents and items that are most relevant to a user's needs and to present them in a manner that is most useful to the user, the list of result documents can be ranked according to various relevance and quality parameters before being presented to the user.

User actions with respect to each result document presented in response to a search query submission can serve as feedback that is indicative of the relevance and quality of the result document with respect to the search query. User feedback data for each result document can be collected from multiple users and aggregated over time, and statistics of the aggregated user feedback data for the result document can be used to adjust the ranking of the document in the result list for future submissions of the search query.

SUMMARY

In general, one innovative aspect of the subject matter described in this specification can be embodied in methods that include the actions of: generating one or more webpages each including a link to a destination document; specifying, by a processor, a style for the link in each of the webpages according to a style sheet language, the style including a behavior trigger indicating user selection of the link in the webpage and a display property that causes retrieval of a resource from a remote server when the behavior trigger is activated by a user at a client displaying the webpage; providing the webpages with the specified style to a plurality of clients; receiving at the remote server one or more requests from at least one of the plurality of clients for the resource; and in response to the receiving, recording a count for user selection of the destination document based on a number of received requests for the resource.

Other embodiments of this aspect include corresponding systems, apparatus, and computer programs, configured to perform the actions of the methods, encoded on computer storage devices.

These and other embodiments can each optionally include one or more of the following features.

The methods further include transmitting one or more respective replies from the remote server to the at least one client in response to the received requests, the replies including no cacheable content.

Each webpage include respective links to multiple destination documents responsive to a search query, and wherein the display property for each link specifies a different address for the resource retrieval.

The address for the resource retrieval specified for each link identifies the search query and the destination document of the link.

The address for the resource retrieval specified for each link further encodes a time at which the webpage containing the link was provided to a respective client.

The behavior trigger includes at least one of: an activation of the link and; a combination of a hover and a focus on the link.

The display property is for displaying a background image for the link, and a source address of the background image is specified by a Uniform Resource Locator (URL) referring to the remote server.

Particular embodiments of the subject matter described in this specification are implemented to realize one or more of the following advantages.

User actions with respect to links to result documents presented on a search result page are detected and reported to a remote server using a form of style specification for the links. The style specification is written according to the syntax of a style sheet language, and the detection and reporting of user clicks on the links are carried out by a client browser while the client browser applies the specified styles to the clicked links. No client-side scripts need to be executed for the click detection and reporting. Therefore, problems caused by incompatibility between the scripts and browser settings are reduced. No intermediate servers are required to redirect the requests for the selected result documents. Therefore, latency for retrieving the selected result documents is also reduced.

Specific combinations of link styles are used for capturing user clicks on different browser platforms, allowing collection of click data from different browser platforms.

The respective style specification for the link to each result document prompts retrieval of a resource identified by a unique click-tracking URL referring to a remote server. These click-tracking URLs have been generated on the server-side and encoded with information that is later used by the server to determine the origin of the clicks (e.g., the result document, the query, position on the result page, and so on). In some variations, client-side script may be used in conjunction with the methods described in this specification, and allow the client to append additional information to the click-tracking URL that is of use to the server.

The concept of using styles to track user clicks on hyperlinks in a webpage can be expanded to track user action on other elements displayed on a webpage. For example, click-through of an advertisement displayed on a publisher's webpage can be tracked by defining a click-tracking style for the advertisement, and the collected click data can be used to determine charges to an advertiser and credits to the publisher in an online advertising environment.

The details of one or more embodiments of the subject matter that are described in this specification are set forth in the accompanying drawings and the description below. Other features, aspects, and advantages of the subject matter will become apparent from the description, the drawings, and the claims.

DETAILED DESCRIPTION

Figure 1:
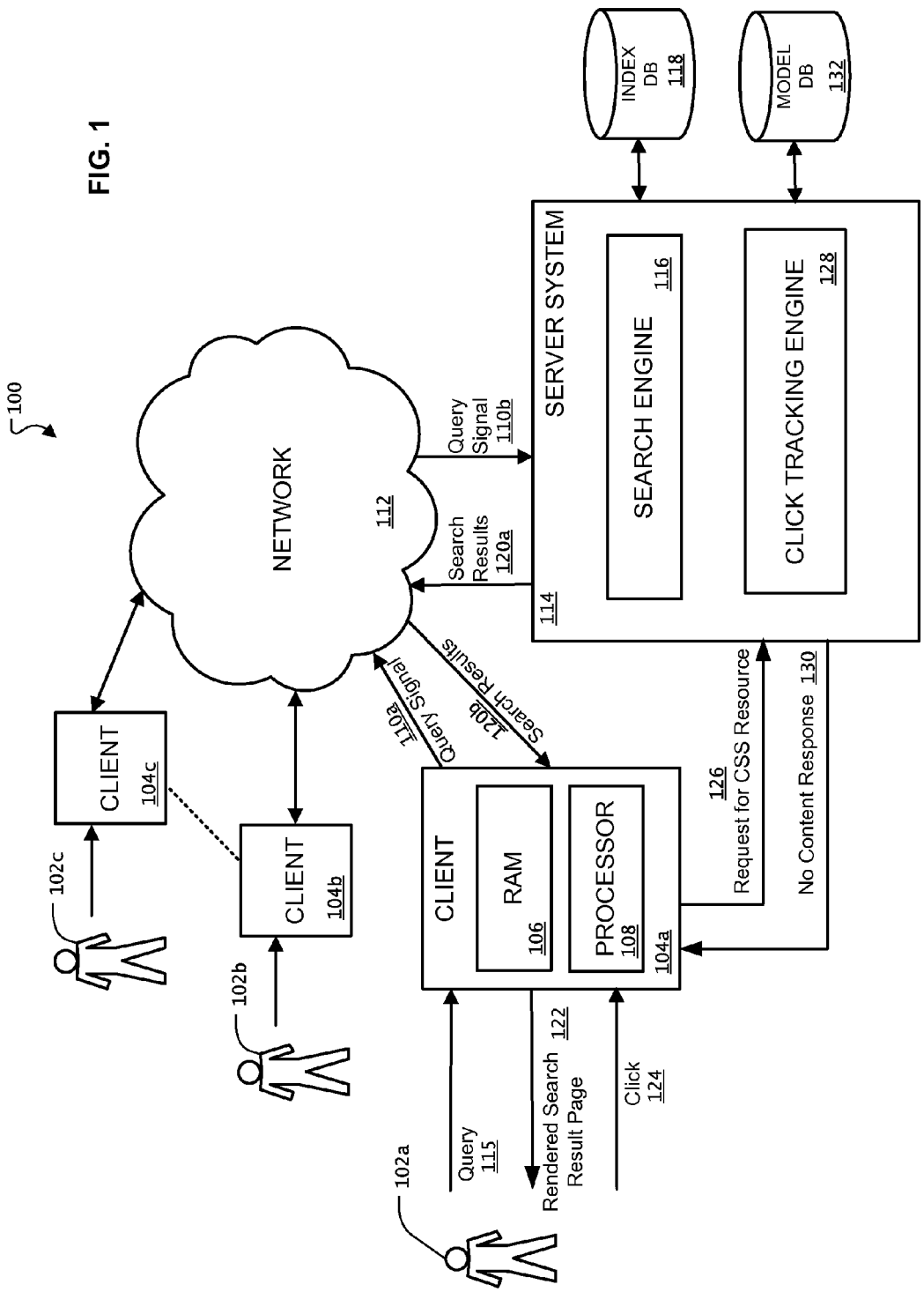
FIG. 1 shows an example information retrieval system.

FIG. 1 shows an example information retrieval system 100. The information retrieval system 100 can be implemented in an internet, intranet, or other client/server environment for retrieving relevant results in response to search queries submitted by users. The system 100 is an example of an information retrieval system in which the systems, components, and techniques described below can be implemented. Although several components are illustrated, there may be fewer or more components in the system 100. Moreover, the components can be distributed on one or more computing devices connected by one or more networks or other suitable communication mediums.

In the example system 100, a user 102 (102a, 102b, 102c) interacts with the system 100 through a client device 104 (104a, 104b, 104c) or other device. The client device 104 can be a computer terminal within a local area network (LAN) or wide area network (WAN). The client device 104 includes a random access memory (RAM) 106 (or other memory and/or a storage device) and a processor 108. The processor 108 is structured to process instructions stored within the device 104. The processor 108 is a single-threaded or multi-threaded processor having one or more processor cores, for example. In some implementations, the processor 108 is structured to process instructions stored in the RAM 106 (or other memory and/or a storage device included with the client device 104) to display graphical information for a user interface.

A user 102a connects to the search engine 116 within a server system 114 to submit a query 115. When the user 102a submits the query 115 through an input device attached to a client device 104a, a client-side query signal 110a is sent into a network 112 and is forwarded to the server system 114 as a server-side query signal 110b. Server system 114 is one or more server devices in one or more locations. A server device 114 includes a search engine 116. The server device 114 includes memory and one or more processors for processing instructions within the memory of the server device 114. These instructions implement one or more components of the search engine 116. The one or more processors are single-threaded or multi-threaded processors having one or more processing cores, for example. The instructions that are stored in the memory also include instructions for communicating with the client devices 104, through the network 112, and sending information needed for creating a graphical presentation in a user interface of the client device 104 (e.g., a search results webpage displayed in a web browser running on the client device).

The server-side query signal 110b is received by the search engine 116. The search engine 116 uses the information within the user query 115 (e.g. query terms) to find relevant documents. The search engine 116 typically includes an indexing engine that actively searches a corpus (e.g., webpages on the Internet) to index the documents found in that corpus. The index information for the documents in the corpus is stored in an index database 118. This index database 118 is accessed to identify documents related to the user query 115. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in a file.

The search engine 116 also includes a ranking engine to rank the documents related to the user query 115. The ranking of the documents is performed using techniques for determining an information retrieval (IR) score for indexed documents in view of a given query. The relevance of a particular document with respect to a particular search term or to other provided information is determined by various appropriate techniques. For example, the general level of back-links to a document that contains matches for a search term may be used to infer a document's relevance. In particular, if a document is linked to by many other relevant documents, it is inferred that the linked document is particularly relevant. This inference is made because the authors of the pointing documents presumably point, for the most part, to other documents that are relevant to their audience. If the pointing documents are in turn the targets of links from other relevant documents, they are considered more relevant, and the first document is considered particularly relevant because it is the target of relevant (or even highly relevant) documents. Such a technique may be the determinant of a document's relevance or one of multiple determinants.

To further improve the accuracy of document ranking, the ranking engine uses additional signals in determining an appropriate ranking for the documents. For example, the ranking of a particular document with respect to a particular search term can be influenced by user feedback collected from previous sessions where the same result document are presented for the same query entered by other users. If many users have shown interest in a particular result document for a particular query, it can be inferred that this particular documents is particularly relevant for subsequent users that enter the same query as well. The ranking of this particular document is promoted in the list of result documents presented to the subsequent users. The user feedback data collected over time is stored in a model database 132. Many parameters of a user's response to a result document can be collected, and the data can be mined to derive signals of interest to improve the search engine and better serve the users.

The search engine 116 forwards the final, ranked result list within a server-side search result signal 120a through the network 112. Exiting the network 112, a client-side search result signal 120b is received by the client device 104a. The search result signal 120 includes the source code for the search result page that is parsed and rendered by a browser program running on the client device 102a. The rendered search result page 122 is displayed on an output device (e.g., a display) of client device 102a. The rendered search result page 122 includes hyperlinks for the result documents responsive to the query 115. When the user clicks on a hyperlink on the rendered search result page 122, the browser program contacts a third-party server serving the result document identified by the clicked hyperlink, retrieves the result document, and renders the result document in a browser window.

In various implementations, the server system 114 implements different mechanisms to collect user feedback data for the search results provided to the client devices. Some mechanisms involve embedding or referencing client-side scripts (e.g., code written in JavaScript, VBScript, ActionScript, and so on) within search result pages that are sent to the client devices. The client-side scripts are loaded either from a local storage or from a remote server and executed on the client device when a user clicks on a tracked link on the search result page. The executed client-side scripts cause tracking information related to the click (e.g., the destination URL for the clicked link, the query that was submitted to obtain the search result page, the timestamp for the click, and so on) to be sent the server system 114.

There are some drawbacks with using client-side scripts for click tracking. First, client-side scripts cause security concerns and not all users allow scripts to be executed on their local devices due to these security concerns. For example, scripts are intrusive to the operating environment on the client devices, and ill-written scripts can cause instability and crashes on the client devices. In addition, support for different scripting or programming languages on different browser platforms are inconsistent, and compatibility between client-side scripts and browser platforms is unpredictable. Finally, real-time script execution causes latency in response time and worsens user experience.

Other mechanisms involve using an intermediate server to gather and redirect requests for the selected result documents to the actual hosts of the selected result documents. For example, the search engine 116 formats the search result pages to include hyperlinks that point to the intermediate server instead of the actual hosts of the result documents. When a user clicks on a hyperlink for a particular result document, the browser contacts the intermediate server and provides the destination URL for the selected result document to the intermediate server. The intermediate server then relays the request to the actual host of the result document, and records a click for the result document for the query.

Although using an intermediate server is reliable in capturing most of the clicks on the search result pages generated by the search engine, there are some drawbacks with this approach as well. For example, supplying the intermediate server(s) to redirect the document requests from all client devices to the appropriate hosts is a complex and costly task. In addition, the intermediate server can become a bottleneck in the communications between client devices and hosts for selected result documents, and worsen the response time on the client devices. Furthermore, when the destination host serving the requested document is slow or not available, the user's browser would mistakenly indicate that document retrieval could not be completed at the intermediate server, causing misdirected blames to the intermediate server.

FIG. 1 illustrates a different approach for click tracking implemented by a click-tracking engine 128. This approach utilizes a particular form of style specification for the hyperlinks to the result documents on the search result page 122. The style specification is written according to the syntax of a style sheet language and sent along with the search result page 122 to the client device 104*a*. When a click 124 is detected by the browser on the client device 102*a*, the browser interpreting the style specification for the clicked link issues a request 126 to the click-tracking engine 128 for a resource needed to apply the specified style to a clicked link. The needed resource is specified in the style specification by a click-tracking URL referring to a remote server (e.g., the click-tracking engine 128 of the server system 114). The click-tracking URL encodes identifiers for the URL of the clicked result document and the query for which the result page was generated. The request 126 including the click-tracking URL is received by the click-track engine 128. The click-track engine 128 parses the click-tracking URL to determine the URL and associated query for the clicked result document, and stores the information in the model database 132. The click-tracking engine 128 optionally issues a "no content" response 130 (e.g., a Hypertext Transport Protocol (HTTP) code 204 response) to the requesting client device 102*a*. The client device 102*a* receives the "no content" response, and applies a default style rather than the specified style to the clicked link so that the click tracking is completely transparent to the user of the client device 102*a*.

The approach of using style sheet specifications to track user click actions is advantageous because it does not require download or execution of client-side scripts on the client devices. Therefore, much compatibility and security concerns associated with the user of client-side scripts are avoided. Furthermore, style sheet languages are supported on most browser platforms. Therefore, adequate data collection coverage can be achieved without funneling the document requests through an intermediate server. In some implementations, the style sheet click-tracking approach is used in conjunction with other click-tracking methods to further improve data collection coverage. More details for style sheet click-tracking are provided in the descriptions set forth with respect to FIGS. 2-5.

Figure 2:
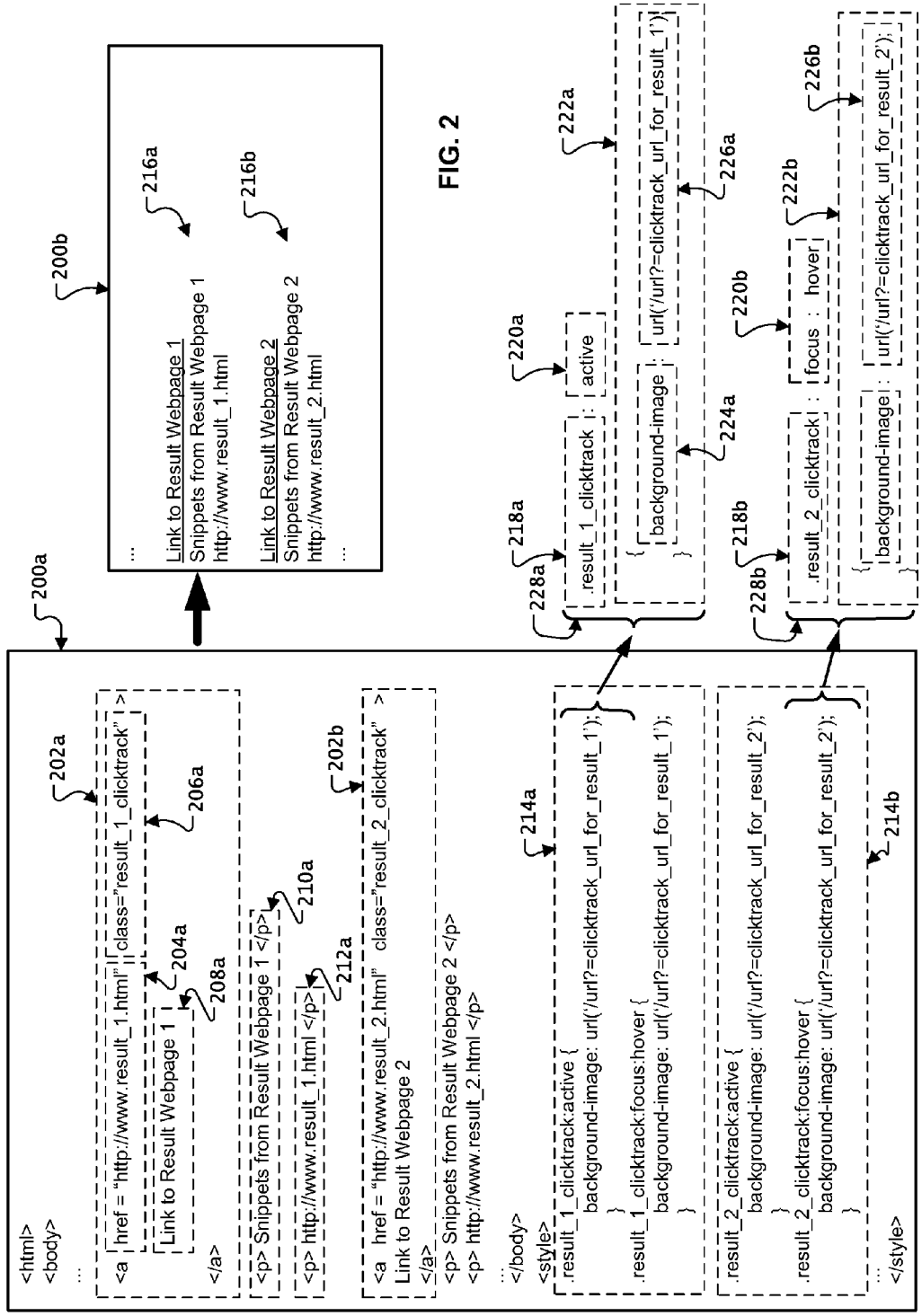
FIG. 2 shows example source code of click-tracking styles for links on a search result page.

FIG. 2 shows example source code of click-tracking styles 214 for links on an example search result page 200. The search result page 200 is a document or a collection of resources that is generated by a search engine in response to a user-submitted search query. The source code 200*a* of the search result page includes annotations or markups that are syntactically distinguishable from the information content (e.g., text, static images, animated images, audios, and videos that are meant to be presented to a user) of the search result page. When the source code 200*a* of the search result page is received by a browser on a client device, the source code 200*a* is parsed and interpreted by a layout engine of the browser to produce a rendered search result page 200*b* (as shown on the right side of FIG. 2). The rendered search result page 200*b* presents the information content according to the format specified by the markups in the source code 200*a*.

In various implementations, the search result page 200 also includes interactive elements, such as interactive text, buttons, forms, plug-in multimedia players, Java applets, and so on, which are generated or loaded by the browser during the rendering process.

One of the most common interactive elements in a webpage is a hyperlink. A hyperlink has an "anchor," which is a location within the webpage from which the hyperlink can be followed. The target of a hyperlink is the destination document to which the hyperlink leads. A user can follow the link by activating its anchor in some way (e.g., by clicking on it). For example, navigation from the search result page 200 to the each of the result documents (e.g., webpages that contain information responsive to the user-submitted search query) is facilitated by the hyperlinks for the result documents that are embedded in the search result document 200. Each hyperlink includes the URL of a corresponding result document, and selection of the hyperlink causes the browser to request, retrieve, and render the result document in the current browser window or in a new browser window.

The source code of the search result page 200 is written in a markup language, such Hypertext Markup Language (HTML). Other markup language for composing a search result page include, for example, Extensible Markup Language (XML), Extensible HyperText Markup Language (XHTML), and so on. Additional markup languages are possible, however.

In addition to the basic layout information specified by the markups in the source code 200*a* of the search result page, other hidden information, such as comments, character encoding, Document Type Definition (DTD), scripts, and style information are also included in some instances. The style information included a webpage provides visual specifications for the elements in the webpage, such as size, font, background, position, and so on. The style information is optionally included in the source code of the webpage or in a style sheet referenced by the source code. The browser also provides default styles if the author of the webpage does not do so, or if the author-specified styles cannot be applied successfully due to various reasons.

The styles of webpage elements (e.g., text, hyperlinks, images, and so on) are specified by a style sheet language or style language. A common style language is Cascading Style Sheets (CSS). CSS is used to style documents written in HTML, XHTML, XML (e.g., Scalar Vector Graphics (SVG) and XML User Interface Language (XUL)), and other markup languages. Other style sheet languages are possible, however. Syntax for a style specification (or rule) in a style language includes a selector, and one or more property-value pairs relevant to the style of the selector. The selector specifies which element (e.g., a link, text, a paragraph, a heading, etc.) in the webpage is to be influenced by the style specification. The property specifies a rendering aspect (e.g., font size, background, position, color, etc.) that is to be influenced by the style specification. The value specifies how exactly the rendering aspect is to be influenced by the style specification. For example, a font size value of "1.5em" in CSS means "1.5 times the size of the surrounding text."

FIG. 2 shows a simplified search result page 200. The search result page 200 is written in HTML and includes style specifications written in CSS. Each style specification or rule in CSS consists of one or more selectors and a declaration block. A declaration block consists of a list of declarations in braces. Each declaration consists of a property, a colon (:), a value, and then a semi-colon (;). For example, a style specification for body text ("body") can be written as "body {color: blue; text-align:center}.

In CSS, a class selector is used to specify a style for a group of elements. The class selector allows style specification for any HTML elements having this class. The class selector definition is indicated by a period "." preceding the name of the class. For example, a class ".center" can be defined as ".center {text-align:center}." An HTML element (e.g., a header) expressed as "<h1 class=center> ... </h1>," will appear center aligned when rendered according to this style specification.

CSS also includes a number of pseudo-classes that can be used to define styles that are to be applied in response to particular user actions toward an associated element (e.g., links or anchor tags in an HTML document). For example, the ":active" pseudo-class applies a particular style to an element when the user selects or otherwise activates the associated element (e.g., by clicking on the element using a pointing device or touching the element on a touch-sensitive surface). The ":hover" pseudo-class applies a particular style to an element when the user hovers the pointer over the associated element. The ":focus" pseudo-class applies a particular style to an element when the element has just received user input and has an input focus. These pseudo-classes defined in CSS allow the browser to track certain user action triggers, and apply a particular style when the user action trigger is activated.

As shown in FIG. 2, the example search result webpage 200 lists two search results. The two search results are result documents identified by their respective URLs "http://www.result_1.html" and "http://www.result_2.html." The HTML code segments 202a and 202b specify the two search results in the search result page 200a. The style sheet specifications 214a and 214b for the two search results are appended at the end of the HTML source code. The rendered result webpage 202b according to the HTML source code and the style sheet specifications is shown on the upper right side of FIG. 2.

Within the source code 200a of the search result page, the links to the result documents are specified by the HTML code segments 202a and 202b enclosed within the anchor tags "<a> ... </a>." The HTML code segment 202a specifies the URL for the first result document using statement 204a ("href=http://www.result_1.html"). The HTML code segment 202a also specifies that the link to the first result document belongs to a class called "result_1_clicktrack." The class is specified using statement 206a ("class=result_1_clicktrack") within the leading anchor tag "<a>." This class specification associates the link with a corresponding click-tracking style defined by the CSS style specification 214a.

Between the anchor tags "<a>" and "</a>" for the first result link, the text block 208a "Link to Result Webpage 1" specifies the text that will appear on the webpage at the location of the anchor/link. As shown on the right side of FIG. 2, the rendered search result page 200b shows the underlined text "Link to Result Webpage 1" indicating the presence of the link to the first result document. When a user clicks on this link, the browser will request the first result document according to the URL "http://www.result_1.html."

In addition to the links to the result documents, the search result page 200 also includes a snippet of text from each result document to show the user why this result document is relevant to the user-submitted search query. For example, the snippet for first result document is included in the HTML source code as statement 210a, and appears in the rendered result webpage 200b as text block "Snippets from Result Webpage 1." In addition, the URL of the first result document is presented to the user as text string, so that the user can see plainly what the URL of the result document is. The text string for the URL is included in the source code as statement 212a, and appears in the rendered result webpage 200b as text block "http://www.result_1.html."

Source code segments similar to that of the first result document is generated by the search engine for each result document included in the search result page 200. Each code segment is rendered as a search result (e.g., 216a for the first result document and 216b for the second result document) including a hyperlink to the result document, a snippet of the result document, and a URL text string of the result document.

The style specifications 214a and 214b are written for two element classes ".result_1_clicktrack" and ".result_2_clicktrack." The definitions of the two classes are indicated by the preceding period ".". The styles specifications 214a and 214b are associated with the two search result links respectively, by the statements "<a ... class=result_1_clicktrack>" and "<a ... class=result_2_clicktrack>" in the HTML source code (e.g., within source code segments 202a and 202b).

The style specification for each class (e.g., ".result_1_clicktrack" or ".result_2_clicktrack") includes two parts. The first part (e.g., 228a) defines a style that is applied for a first pseudo-class ":active." The second part (e.g., 228b) defines a style that is applied for a combination of two other pseudo-classes ":hover" and ":focus." The pseudo-class ":active" indicates that a style is to be applied to the HTML element associated with the pseudo-class when the HTML element is "active" by a user action. The user actions that would trigger the application of the style vary slightly for different browsers. In some browsers (e.g., Internet Explorer), mouse clicks on the associated HTML element using the left, middle, or right mouse buttons all constitute an "activation" of the element. In some browsers (e.g., FireFox), only mouse clicks using the left mouse button constitutes an "activation" of the element. For the browser platforms that define activation as "left-clicks" only, the combination of the ":hover" and the ":focus" pseudo-classes is used to identify user actions that signifies a click using the other mouse buttons (e.g., middle or right mouse buttons) or the keyboard. For example, when the user hovers the mouse pointer over a link, and presses the right or middle mouse button, the link would receive user input focus and, at the same time, have a mouse pointer hovering over it. Thus, the combination of ":focus" and ":hover" would detect this type of clicks that are not captured by the ":active" pseudo-class. For another example, when the user hovers the mouse pointer over a link, and presses the "Enter" key on the keyboard, the link would also have user input focus and have a mouse pointer hovering over it. Thus, the combination of ":focus" and ":hover" would also detect this type of keyboard selection of the link.

By specifying a click-tracking style for both the ":active" pseudo-class and the combination of ":hover" and ":focus" pseudo-classes, user actions that indicate a user selection of a link can be detected on multiple browser platforms regardless of which mouse buttons or input keys are pressed for the link selection. Although either one of the ":active" and the combination of ":hover" and "focus" pseudo-classes could be used alone for click-tracking, having both in the style specification allows more clicks to be captured. In some style sheet languages, the names used for the ":active," ":hover," and ":focus" pseudo-classes may vary. However, a person skilled in the art should be able to recognize the corresponding pseudo-classes having equivalent properties in each style sheet language.

The first part 228a of the click-tracking style specification includes a selector 218a, which includes the class name ".result_1_clicktrack" and the pseudo-class name ":active." The style specification 228a further includes the declaration block 222a enclosed in braces. The declaration block 222a specifies a property 224a of an associated element that is to be influenced by the style specification. The property 224a for the click-tracking style is the "background-image" property. The value 226a of the "background-image" property is specified by a URL 226a that points to a resource located at a remote server. The URL 226a is also referred to as the "click-tracking URL" in other parts of this specification.

When the user "activates" the associated element of the click-tracking style, the browser would start applying the style according to the style specification defined in this part 228a, i.e., applying a background image retrieved from the URL 226a to the associated element. In order to apply this style according to the style specification, the browser needs to contact the remote server identified in the URL 226a, and issues a request for the resource (e.g., a Hypertext Transport Protocol (HTTP) request including the URL 226a). This request serves as a notification to the remote server that a link associated with a particular search result has been selected by a user. As will be explained later with respect to FIG. 4A, the click-tracking URL 226a are generated by the search engine providing the search result page 200, and encodes information identifying the URL of the selected search result.

The second part 228b works similarly as the first part 228a, except that the user action triggers that will prompt application of the click-tracking styles are defined by the combination of the ":hover" and the ":focus" pseudo-classes. The second part 228b includes a selector, which includes a class name 218b ("e.g., ".result_2_clicktrack") and the combination of pseudo-classes 220b (i.e., ":hover" and ":focus"). The declaration block 222b specifies a value for the background image as a second click-tracking URL 226b. The second click-tracking URL 226b is for tracking the clicks on the link for the second search result. The click-tracking URL 226b is distinct from the click-tracking URL 226a for the first search result, even though both click-tracking URLs may point to the same remote server. The difference between URL 226a and URL 226b is used by the remote server to distinguish the clicks for the first result document and the clicks for the second result document. The click-tracking URL 226a and the click-tracking URL 226b optionally encode other information that is relevant to determining the user feedback for the search results, such as the query to which the result document were responsive, the position for the search result on the search result page, and the timestamps for the clicks.

Although in the example in FIG. 2, the style specification for each link is written as two parts (e.g., one part for the ":active" pseudo-class, and the other for the combination of ":focus" and ":hover" pseudo-classes), the two parts can also be combined in the following format: .result_1_clicktrack: active, .result_1_clicktrack:focus:hover {background-image:urk('url?=clicktrack_url_for_result_1');}. In other words, the two class names (e.g., ".result_1_clicktrack:active" and ".result_1_clicktrack:focus:hover") can be separated by a comma, and the declaration block within the braces can be shared by the two classes.

In addition, although in the example in FIG. 2, the search result page 200 is written in HTML, in various implementations, other markup languages, such as XHTML, XML, and so on, may also be used. In this example, the style specification is written according to CSS. Other style sheet languages that allow style specifications based on user action triggers analogous to "active," "hover" and "focus" can be used as well. Syntactical variations are possible for click-tracking styles specified in CSS and other style sheet languages. Examples of style sheet languages include, Document Style Semantics and Specification Language (DSSSL), Extensible Stylesheet Language (XSL), and so on.

Figure 3:
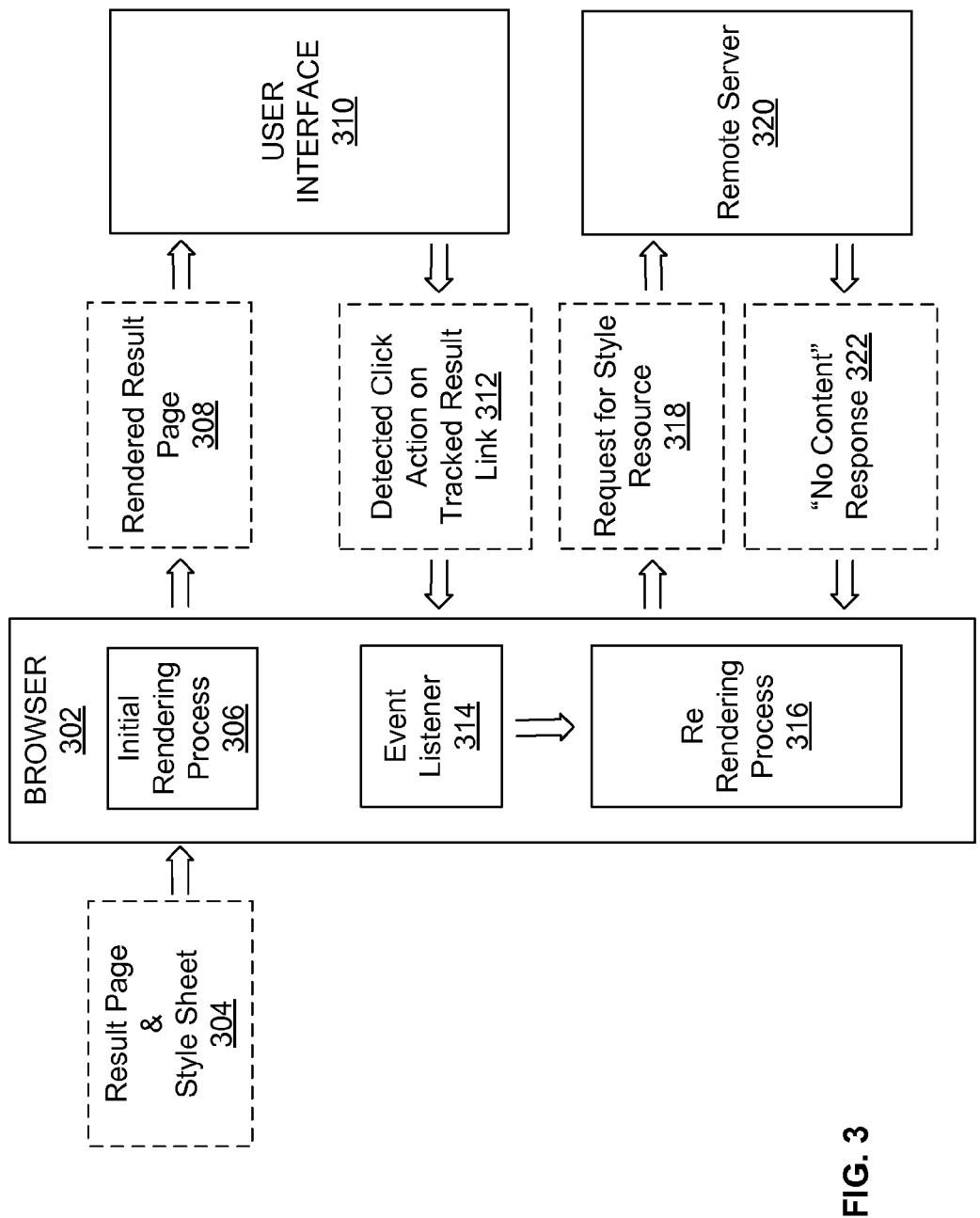
FIG. 3 illustrates an example client-side process for click detection and reporting using click-tracking link styles.

FIG. 3 illustrates an example client-side process for click detection and reporting using click-tracking link styles. When a search result page's source code and associated style sheets including the click-tracking style specification for result links (e.g., result page & style sheet 304) are downloaded to a client device by a browser 302 running on the client device, the browser 302 starts an initial rendering process 306 to render the result page according to the source code of the result page and the style specifications in the style sheet.

The rendering process 306 is performed by a layout engine of the browser 302. Examples of the layout engine include, Gecko (the layout engine for Firefox, Camino, Mozilla Application Suite, Netscape, and other Gecko-based browsers), HTMLayout (the embeddable HTML/CSS rendering engine for Windows and Windows Mobile operating systems), Tasman (the layout engine for Internet Explorer 5 for Macintosh computers), Trident (the layout engine for Internet Explorer since version 4.0), WebKit (the layout engine for Safari, Arora, Midori, OmniWeb, Shiira, iCab since version 4, Epiphany, and SRWare Iron), and so on.

The initial rendering process 306 produces a rendered result page 308, and the rendered result page 308 is presented to the user through a user interface 310 (e.g., in a browser window). The rendered result page 308 displays a ranked list of search results identified by the search engine as being responsive to a user-submitted search query. The list of search result includes hyperlinks that lead to the result documents. Each link is associated to a respective style definition that is specified according to a style sheet language (e.g., CSS), the click-tracking style including a behavior trigger indicating user selection of the link in the result page and a display property that prompts retrieval of a resource from a remote server when the behavior trigger is activated by a user at a client displaying the result page 308.

When the user viewing the rendered result page 308 through the user interface 310 selects a link for a result document (e.g., by clicking on the link using a point device), the user input signal 312 is detected by an event listener 314 of the browser 302. According to the style specification, the event listener 314 monitors the states of each link that is associated with the click-tracking style specification, and detects when the behavior triggers indicating user selection of the link in the webpage (e.g., ":active," ":focus," and/or ":hover" states) have occurred.

Once the requisite behavior trigger indicating user selection of the link in the rendered result page 308 (e.g., "active" or the combination of "hover" and "focus") has been detected, the browser's layout engine starts a re-rendering process 316 to apply the specified styles to the selected link. Since the style specification includes a display property that requires a resource located at a remote server (e.g., a background image from a remote server), the browser's layout engine causes the browser to issue a request 318 for the required style resource to the remote server 320.

The remote server 320 receives the request for the style resource and registers the click for the result document that is pointed to by the selected link. Optionally, the remote server 320 responds to the request 318 with a "no content" response 324 (e.g., an HTTP 204 response). The browser 302 receives the "no content" response 324, and applies a default style for the clicked link. The "no content" response 324 is used in order to prevent the browser 302 from caching the requested resource or cause a visible change to the rendered webpage due to this response. If the browser 302 had a cached copy of the requested resource, the browser will typically use the cached copy rather than issuing the request for the resource to the remote server each time when the user clicks on the link. In addition to issuing the request for the style resource to the remote server, the browser 302 also issues a request to the result document (to a host of the result document as identified by the URL of the result document) whose link has been selected by the user. When the result document is retrieved, the result document is rendered by the layout engine of the browser 302 and presented to the user through the user interface 310.

Figure 4A:
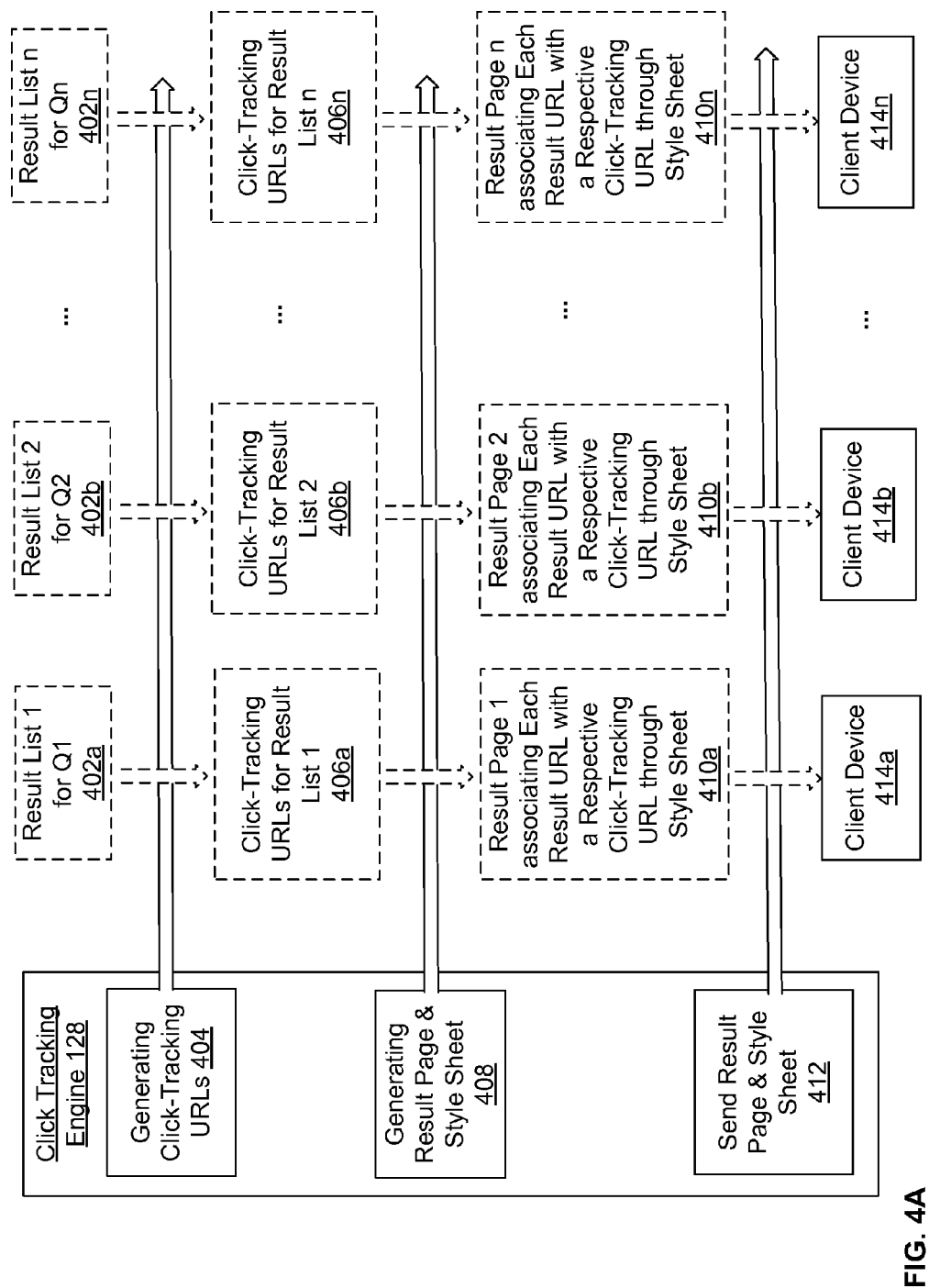
FIG. 4A illustrates an example server-side process for generating search result pages with corresponding click-tracking link styles.

FIG. 4A illustrates an example server-side process for generating search result pages with corresponding click-tracking link styles.

In some implementations, the server device is the server system 114 in FIG. 1. The server device includes a click-tracking engine 128. The click-tracking engine 128 implements the process for generating search result pages with corresponding click-tracking link styles and sends the search result pages to a number of client devices 414 (414*a* through 414*n*) in response to search queries submitted by users of the client devices 414. The click-tracking engine 128 receives lists of search results from the search engine of the server system 114. Each result list 402 (e.g., 402*a* through 402*n*) includes URLs for result documents responsive to a respective user-submitted query.

After receiving the result list 402 for a particular query (Q), the click-tracking engine 128 generates a respective click-tracking URL for each of the result URL in the search result list 402 (process 404). Each of the click-tracking URL is unique and encodes information such as the address of a remote server for recording click data based on the number of received requests for style resources, a corresponding result URL (or an identifier of the result URL) that is to be tracked by the click-tracking URL, the query (or an identifier of the query) for which the result list was generated, and a current timestamp. Other information that is optionally encoded in the click-tracking URL includes, for example, a position of the link on the result page, the total number of results on the result page, an identifier for the user issuing the search query, and so on. The click-tracking link can also include a special signature string that indicates to the remote server that this is a click-tracking URL, and a response with no cacheable content (e.g., an HTTP code 204 response) rather than an actual resource should be returned to the requesting client device. In various implementations, the special signature is encrypted or digitally signed by the click-tracking engine 128 to eliminate forged user clicks. In various implementations, the click-tracking URL can also encode user-specific information, such as a user identifier, a session identifier, and so on.

Once the click-tracking URLs 406 have been generated for all result URLs in the result list 402, the click-tracking engine 128 generates the search result page 410 associating each result URL with a respective click-tracking URL through the style sheet (process 408). The style sheet specifies the click-tracking link styles, for example, according to the format shown in FIG. 2.

After the result page 410 with the click-tracking style specifications have been generated, the click-tracking engine 128 sends the result page 410 with the click-tracking style specifications to the client device 414 in response to the search queries submitted by the users of the client devices 414. The click-tracking style specifications are either appended in the source code of the result page 410, or as a separate style sheet referenced in the source code for the result page.

Multiple result lists 402 (402*a* through 402*n*) may be processed in parallel by the click-tracking engine 128 on the server system. The click-tracking engine 128 is optionally distributed on multiple server devices.

Figure 4B:
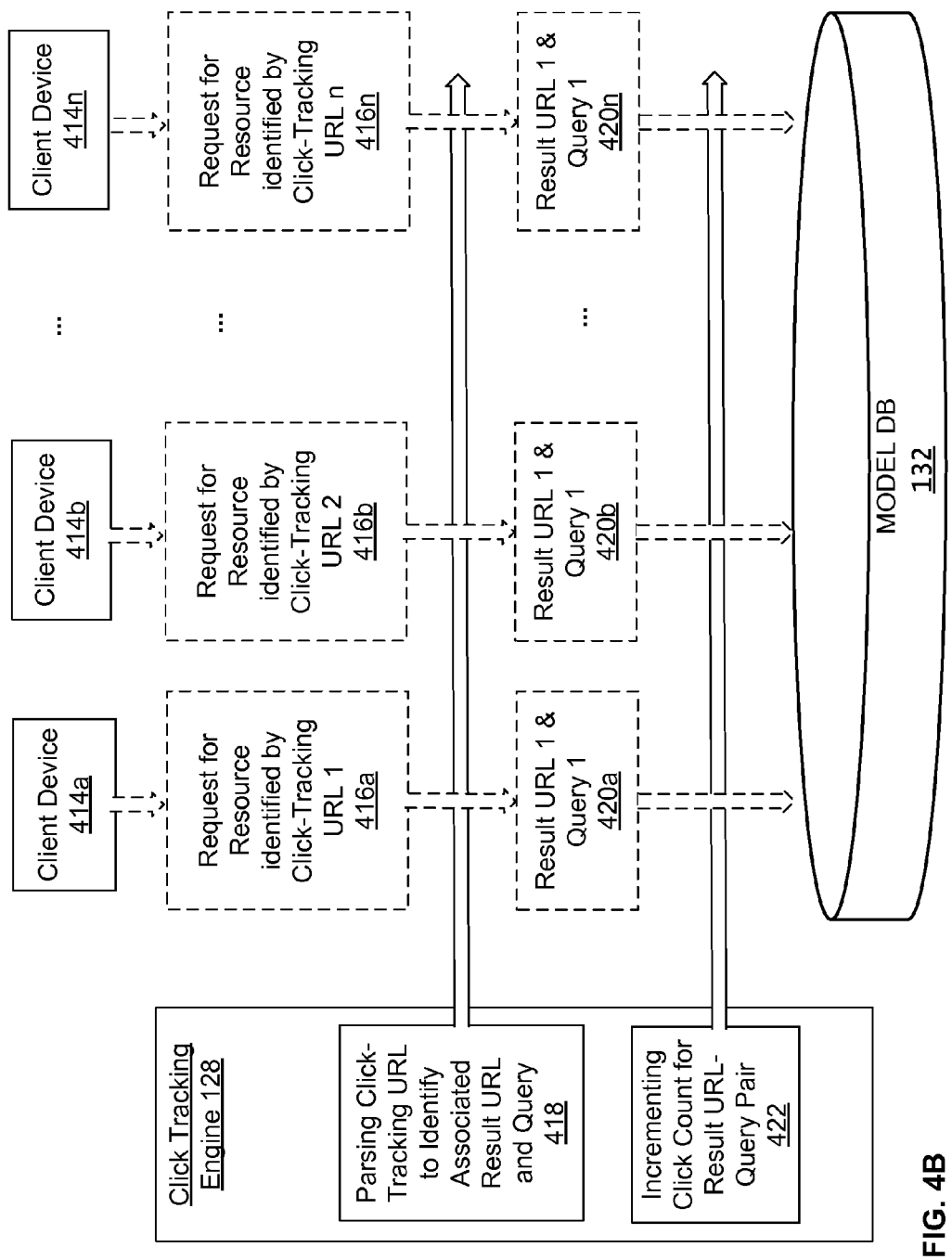
FIG. 4B illustrates an example server-side process for accumulating click data through requests for style resources received from client devices.

FIG. 4B illustrates an example server-side process for accumulating click data through requests for style sheet resources received from the client devices 414. Out of all the client devices 414 that received the result page and associated click-tracking style specifications, users of at least some of these client devices will click on the links for at least some of tracked result documents. When a user clicks on a link for a tracked result document, the browser on the client device of the user starts a re-rendering process to apply the specified style for the clicked link. Since the specified style for the clicked link requires retrieval of a resource (e.g., a background image) from a remote server, the browser issues a request 416 for the resource as specified by the click-tracking URL in the click-tracking style specification. The request 416 is, for example, an HTTP request made according to the click-tracking URL. The remote server receives the request 416 for the style resource, and parses the click-tracking URL in the request to identify the associated result URL and the query for the result URL (process 418). The click-tracking URL optionally includes various types of information in a particular format. An example encoding of the click-tracking URL is "http://remote_server_domain_name/url?resultURL=http://www.result_1.html&query=Q1&sig=SpecialSignatureforClickTracking." Once the tracked result URL and the query has been identified from the click-tracking URL, the click for the result URL and query pair is registered and the click count for the result URL and query pair is incremented (process 422). The click data for the result URL and query pair is entered into the model database 132.

In various implementations, for each user selection of a result document presented is response to a search query, model database 132 also stores information such as the user's dwell time (T) on the document, the language (L) employed by the user, and the country (C) where the user is likely located (e.g., based on the server used to access the IR system). Other information such as position(s) of click(s) (i.e., user selection(s)) in the user interface, information about the browser session (e.g., existence and type of previous clicks, and post-click session activity), IR scores of clicked results, IR scores of all results shown before the click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main result page and clicking on another document result is also recorded. This time can be computed based on the timestamps for clicks on the same result document. These timestamps are compared to the initial timestamp for when the result page is generated and sent to the user, and the differences can be used to determine the dwell time between clicks. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

In various implementations, the additional information stored in the model database 132 are obtained from other sources. In some implementations, the client devices append information to the click-tracking URL according to a particular format. The appended information is parsed by the click-tracking engine 128, and entered into the model database 132 as well.

Figure 5:
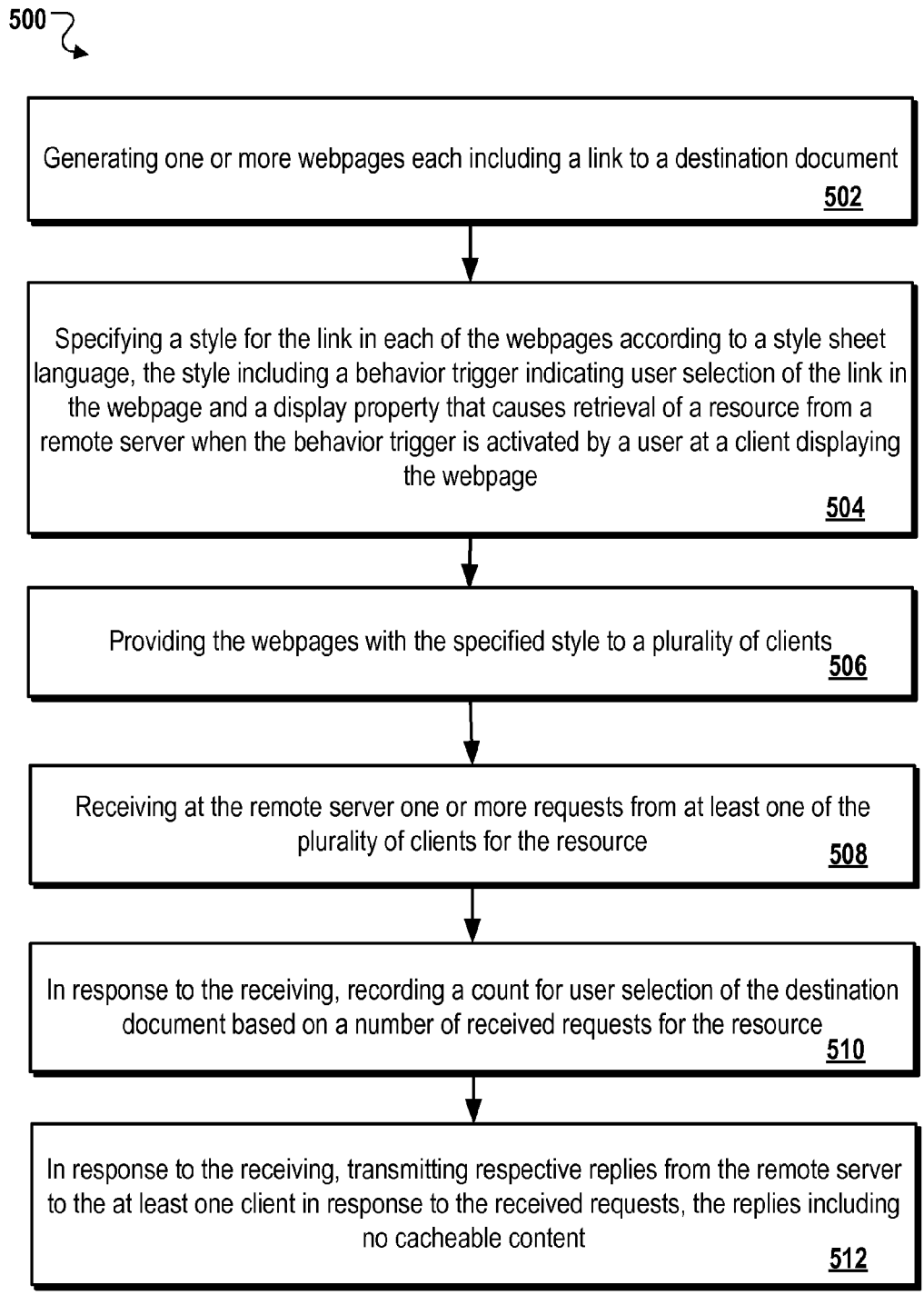
FIG. 5 is a flow diagram of an example process for click tracking through link styles.

FIG. 5 is a flow diagram of an example process 500 for click tracking through link styles.

The process 500 starts when one or more webpages are generated, each including a link to a destination document (502). For an information retrieval system, the destination document are result documents responsive to a user-submitted search query, and the one or more webpages are search result pages sent from a search engine server to one or more client devices.

A style is specified for the link in each of the webpages according to a style sheet language, the style including a behavior trigger indicating user selection of the link in the webpage and a display property that causes retrieval of a resource from a remote server when the behavior trigger is activated by a user at a client displaying the webpage (504).

In some implementations, the behavior trigger includes at least one of an activation of the link and a combination of a hover and a focus on the link. The display property is for displaying a background image for the link, and a source address of the background image is specified by a Uniform Resource Locator (URL) referring to the remote server.

In some implementations, each webpage include respective links to multiple destination documents responsive to a search query, and the display property for each link specifies a different address for the resource retrieval. In various implementations, the address for the resource retrieval specified for each link encodes identifiers for the destination document of the link and the search query to which the destination document is responsive as a search result. In some implementations, the address for the resource retrieval specified for each link further encodes a time at which the webpage containing the link was provided to a respective client.

After the style is specified for the link in each webpage, the webpages with the specified style are provided to a plurality of clients (506).

When users of the client devices click on the tracked links on the webpages, the browsers on the client devices initiate re-rendering processes to apply the specified styles to the clicked links. The re-rendering processes prompt the browsers on the client devices to issue requests for the style resources to a remote server. The requests are, for example, HTTP requests according to the URLs of the required style resources. The requests are received at the remote server from at least one of the plurality of clients for the resource (508). In response to the receipt of the requests, a count for user selection of the destination document is recorded based on a number of received requests for the resource (510). In some implementations, respective replies are transmitted from the remote server to the at least one client in response to the received requests, the replies including no cacheable content (512). For example, the replies including no cacheable content are HTTP code 204 responses. An HTTP code 204 response includes no message body and is terminated by the first empty line after the header fields. A response with no cacheable content allows the remote server to fulfill the request with only meta-information and no actual content or resources. A client receiving the response would not change its document view using the meta-information in the receive response.

Figure 6:
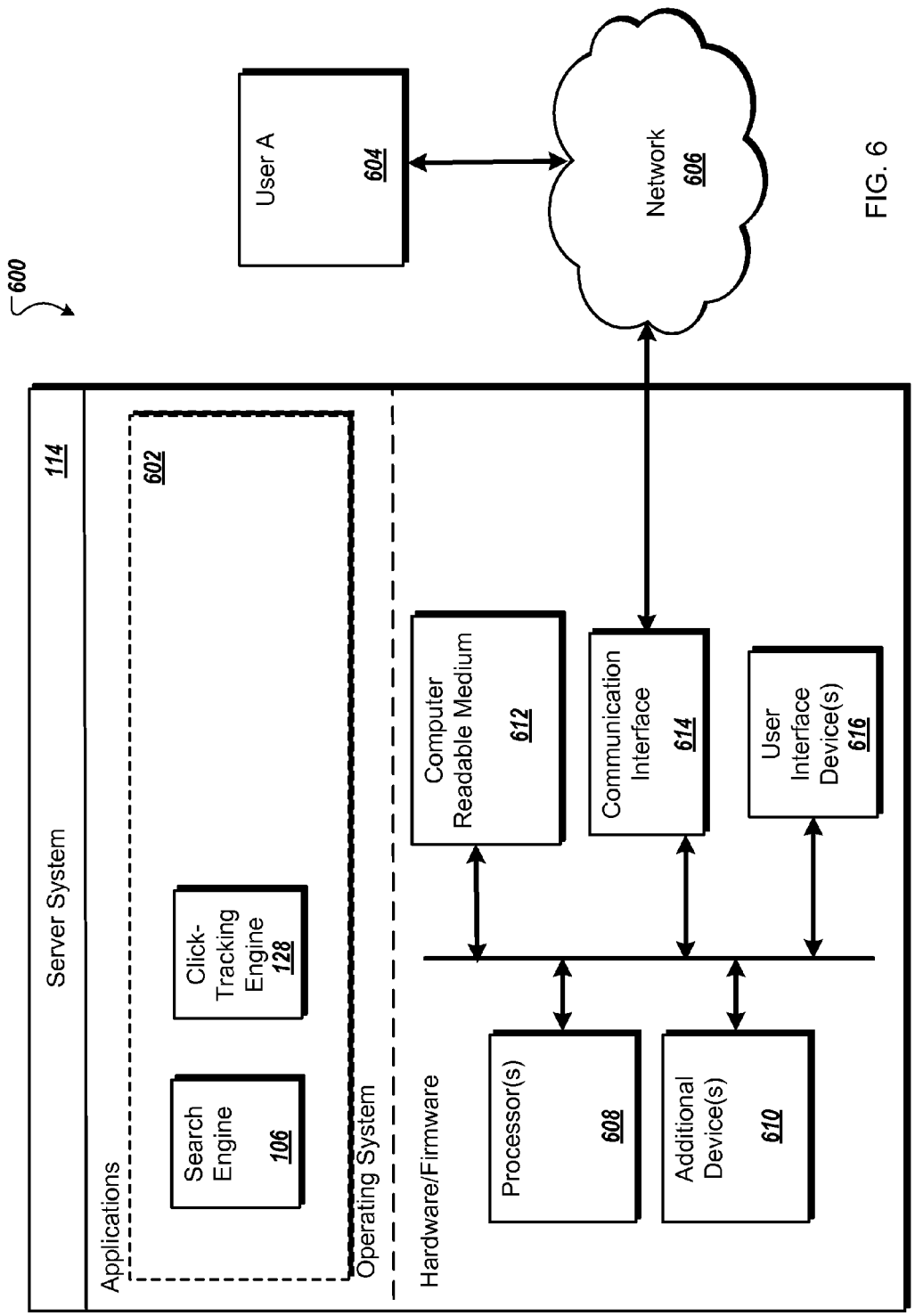
FIG. 6 is illustrates an example architecture of a system.

FIG. 6 illustrates an example architecture of a system 600. The system 600 comprising a server 114 and one or more user computers such as user computer A 604. The server 114 and user computers 604 are connected through a network 606.

The server 114 consists of one or more data processing apparatus. While only one data processing apparatus is shown in FIG. 6, multiple data processing apparatus can be used. The server includes various modules, e.g. executable software programs, such as a search engine 116 and a click-tracking engine 128. Each module runs as part of the operating system on the server, runs as an application on the server, or runs as part of the operating system and part of an application on the server 114. These modules can implement the processes described with respect to FIGS. 3-5, for example.

The server 114 can also have hardware or firmware devices including one or more processors 608, one or more additional devices 610, a computer readable medium 612, a communication interface 614, and one or more user interface devices 616. Each processor 608 is capable of processing instructions for execution within the server 114. In some implementations, the processor 608 is a single-threaded processor. In other implementations, the processor 608 is a multi-threaded processor. Each processor 608 is capable of processing instructions stored on the computer readable medium 612 or on a storage device (e.g., an additional device 610). The server 114 uses its communication interface 614 to communicate with one or more computers, for example, over a network. Examples of user interface devices 616 include a display, a camera, a speaker, a microphone, a tactile feedback device, a keyboard, and a mouse.

The server 114 can store instructions that implement operations associated with the modules described above, for example, on the computer readable medium 612 or one or more additional devices 610, for example, one or more of a floppy disk device, a hard disk device, an optical disk device, or a tape device.

User computers such as user computer A 604 are connected to the server 114 through the network 606. Users submit search queries to the server 114 and select search results received from the server 114 using user computers such as user computer A 604, for example, using a web-browser running on the computer. The server 114 generates user feedback data from the actions of the users, for example, by tracking what search queries are submitted by users and what search results responsive to a query are selected by users. Users can also use user computers such as user computer A 604 to submit search queries to the server 114 and to view search results responsive to their queries.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. Accordingly, other embodiments are within the scope of the following claims.

What is claimed is:

1. A computer-implemented method, comprising:
    generating, by a server system, one or more webpages each including a link to a respective destination document hosted on a respective destination server;
    specifying, by the server system, a style for the link in each of the webpages according to a style sheet language, the style including a behavior trigger and a display property;
        wherein the display property includes a retrieval address for a resource at the server system,
        wherein the behavior trigger is programmed to be activated by a client's selection of the link on the webpage,
        wherein the activation causes a request for the resource to be made to the retrieval address at the server system, and
        wherein the resource is different from the destination document and the destination server is different from the server system;
    providing, by the server system in response to a search query received from a client, the webpages, each with the specified style, to the client;
    receiving, at the server system, a plurality of requests for a resource from the client, wherein each request for the resource is caused by an activation of a behavior trigger, and wherein the behavior trigger is specified in a style in one of the webpages for a link to a destination document; and
    counting, at the server system, how many times the client has selected the destination document in response to receiving the plurality of requests, and
    transmitting, from the server system, a respective reply to the client in response to each of the received requests for the resource, the respective reply having no cacheable content with regard to how many times the client has selected the destination document.

2. The method of claim 1, wherein each webpage includes respective links to multiple destination documents responsive to the search query, and wherein the display property for each link specifies a different retrieval address for the respective resource.

3. The method of claim 2, wherein the retrieval address for the resource specified for each link identifies the search query and the destination document of the link.

4. The method of claim 1, wherein the retrieval address for the resource retrieval specified for the link further encodes a time at which a respective webpage containing the link was provided to the client.

5. The method of claim 1, wherein the behavior trigger indicates at least one of: an activation of the link or a combination of a hover and a focus on the link.

6. The method of claim 1, wherein the display property is for displaying a background image for the link, and a source address of the background image is specified by a Uniform Resource Locator (URL) referring to the server system.

7. The method of claim 1, wherein the display property includes a retrieval address for a resource that is specific to the destination document.

8. The method of claim 1, wherein the behavior trigger is specified in a style in one of the webpages for a link to a destination document that is associated with the resource.

9. The method of claim 1, comprising influencing a ranking of the destination document based on counting how many times the client has selected the link to the destination document.

10. A non-transitory computer-readable medium having instructions stored thereon, which, when executed by one or more computers, cause the one or more computers to perform operations comprising:
    generating one or more webpages each including a link to a respective destination document hosted on a respective destination server;
    specifying a style for the link in each of the webpages according to a style sheet language, the style including a behavior trigger and a display property,
        wherein the display property includes a retrieval address for a resource at the one or more computers,
        wherein the behavior trigger is programmed to be activated by a user selection of the link on the webpage,
        wherein the activation causes a request for the resource from to be made to the retrieval address at the one or more computers, and,
        wherein the resource is different from the destination document and the destination server is different from the one or more computers;
    providing, in response to a search query from a client, the webpages, each with the specified style, to the client;
    receiving a plurality of requests for a resource from the client, wherein each request for the resource is caused an activation of a behavior trigger, and wherein the behavior trigger is specified in a style in one of the webpages for a link to a destination document; and
    counting how many times the client has selected the destination document in response to receiving the plurality of requests; and
    transmitting a respective reply to the client in response to each of the received requests for the resource, the respective reply having no cacheable content with regard to how many times the client has selected the destination document.

11. The computer-readable medium of claim 10, wherein each webpage include respective links to multiple destination documents responsive to the search query, and the display property for each link specifies a different retrieval address for the respective resource.

12. The computer-readable medium of claim 11, wherein the retrieval address for the resource specified for each link identifies the search query and the destination document of the link.

13. The computer-readable medium of claim 12, wherein the behavior trigger indicates at least one of: an activation of the link or a combination of a hover and a focus on the link.

14. The computer-readable medium of claim 12, wherein the display property is for displaying a background image for the link, and a source address of the background image is specified by a Uniform Resource Locator (URL) referring to the one or more computers.

15. The computer-readable medium of claim 10, wherein the retrieval address for the resource specified for the link further encodes a time at which a respective webpage containing the link was provided to the client.

16. A system comprising:
one or more computers;
memory coupled to the one or more computers and storing instructions which, when executed by the one or more computers, causes the one or more computers to perform operations comprising:
generating one or more webpages each including a link to a respective destination document hosted on a respective destination server;
specifying a style for the link in each of the webpages according to a style sheet language, the style including a behavior trigger and a display property,
wherein the display property includes a retrieval address for a resource at the system,
wherein the behavior trigger is programmed to be activated by a client's selection of the link on the webpage,
wherein the activation causes a request for the resource to be made to the retrieval address at the system, and
wherein the resource is different from the destination document and the destination server is different from the system;
providing, in response to a search query received from a client, the webpages, each with the specified style, to the client;
receiving a plurality of requests for a resource from the client, wherein each request for the resource is caused by an activation of a behavior trigger, and wherein the behavior trigger is specified in a style in one of the webpages for a link to a destination document;
counting how many times the client has selected the destination document in response to receiving the plurality of requests; and
transmitting a respective reply to the client in response to each of the received requests for the resource, the respective reply having no cacheable content with regard to how many times the client has selected the destination document.

17. The system of claim 16, wherein each webpage include respective links to multiple destination documents responsive to the search query, and the display property for each link specifies a different retrieval address for the respective resource.

18. The system of claim 17, wherein the retrieval address for the resource specified for each link identifies the search query and the destination document of the link.

19. The system of claim 16, wherein the retrieval address for the resource retrieval specified for the link further encodes a time at which a respective webpage containing the link was provided to a respective client.

20. The system of claim 16, wherein the behavior trigger indicates at least one of: an activation of the link or a combination of a hover and a focus on the link.

21. A system comprising:
one or more computers;
memory coupled to the one or more computers and storing instructions which, when executed by the one or more computers, causes the one or more computers to perform operations comprising:
generating one or more webpages each including a link to a respective destination document hosted on a respective destination server;
specifying a style for the link in each of the webpages according to a style sheet language, the style including a behavior trigger and a display property,
wherein the display property includes a retrieval address for a resource at the system,
wherein the behavior trigger is programmed to be activated by a client's selection of the link on the webpage,
wherein the activation causes a request for the resource to be made to the retrieval address at the system, and
wherein the resource is different from the destination document and the destination server is different from the system;
providing, in response to a search query received from a client, the webpages, each with the specified style, to the client;
receiving a plurality of requests for a resource from the client, wherein each request for the resource is caused by an activation of a behavior trigger, and wherein the behavior trigger is specified in a style in one of the webpages for a link to a destination document; and
counting how many times the client has selected the destination document in response to receiving the plurality of requests; and
transmitting a respective reply to the client in response to each of the received requests for the resource, the respective reply having no cacheable content with regard to how many times the client has selected the destination document.

\* \* \* \* \*

UNITED STATES PATENT AND TRADEMARK OFFICE
CERTIFICATE OF CORRECTION

PATENT NO.       : 8,543,668 B1
APPLICATION NO.  : 12/625424
DATED            : September 24, 2013
INVENTOR(S)      : Dustin Long Page 1 of 1

It is certified that error appears in the above-identified patent and that said Letters Patent is hereby corrected as shown below:

On the Title Page:

Col. 1, line 6, (Other Publications), please delete "papes." and insert therefor -- pages. --;

In the Claims:

Column 17, lines 56-57, Claim 1, please delete "document; and" and insert therefor -- document; --;

Column 18, line 54, Claim 10, please delete "document; and" and insert therefor -- document; --; and Column 20, lines 15-53, Claim 21, please delete the entire text of claim 21 and insert therefor -- 21. The system of claim 16, wherein the display property is for displaying a background image for the link, and a source address of the background image is specified by a Uniform Resource Locator (URL) referring to the system. --

Signed and Sealed this
Third Day of December, 2013

Margaret A. Focarino
*Commissioner for Patents of the United States Patent and Trademark Office*